United States Patent
Lee et al.

(10) Patent No.: US 12,202,234 B2
(45) Date of Patent: Jan. 21, 2025

(54) EXTERIOR FILM OF BUILDING FOR PROTECTING GLASS

(71) Applicant: STEK CO., LTD., Seoul (KR)

(72) Inventors: Changsuk Lee, Seoul (KR); Inhwan Oh, Seongnam-si (KR); Subin Park, Seoul (KR); Jinwoo Choi, Seoul (KR)

(73) Assignee: STEK CO., LTD., Seoul (KR)

( * ) Notice: Subject to any disclaimer, the term of this patent is extended or adjusted under 35 U.S.C. 154(b) by 0 days.

(21) Appl. No.: 17/836,864

(22) Filed: Jun. 9, 2022

(65) Prior Publication Data

US 2023/0398770 A1 Dec. 14, 2023

(51) Int. Cl.
| | |
|---|---|
| *B32B 27/08* | (2006.01) |
| *B32B 7/12* | (2006.01) |
| *B32B 27/20* | (2006.01) |
| *B32B 27/26* | (2006.01) |
| *B32B 27/36* | (2006.01) |
| *B32B 27/40* | (2006.01) |
| *C08K 3/04* | (2006.01) |
| *C08K 3/22* | (2006.01) |
| *C08K 5/00* | (2006.01) |

(Continued)

(52) U.S. Cl.
CPC ............... *B32B 27/08* (2013.01); *B32B 7/12* (2013.01); *B32B 27/20* (2013.01); *B32B 27/26* (2013.01); *B32B 27/36* (2013.01); *B32B 27/40* (2013.01); *C09D 133/08* (2013.01); *C09D 175/04* (2013.01); *C09J 133/08* (2013.01); *C09J 175/04* (2013.01); *B32B 2250/03* (2013.01); *B32B 2255/10* (2013.01); *B32B 2255/205* (2013.01); *B32B 2255/26* (2013.01); *B32B 2307/42* (2013.01); *B32B 2307/584* (2013.01); *B32B 2307/762* (2013.01); *B32B 2367/00* (2013.01); *B32B 2375/00* (2013.01); *C08K 3/04* (2013.01); *C08K 3/22* (2013.01); *C08K 2003/2231* (2013.01); *C08K 2003/2258* (2013.01); *C08K 3/2279* (2013.01); *C08K 5/0025* (2013.01); *C08K 5/005* (2013.01); *C08L 75/04* (2013.01)

(58) Field of Classification Search
None
See application file for complete search history.

(56) References Cited

U.S. PATENT DOCUMENTS

| | | | | |
|---|---|---|---|---|
| 4,387,129 | A * | 6/1983 | Vincent | B32B 27/08 |
| | | | | 428/355 N |
| 5,824,394 | A * | 10/1998 | Kinoshita | C08J 7/046 |
| | | | | 428/458 |

(Continued)

FOREIGN PATENT DOCUMENTS

| KR | 10-1999-0026349 | 4/1999 |
|---|---|---|
| KR | 10-2019-0118266 | 10/2019 |
| KR | 10-1994928 | 10/2019 |

OTHER PUBLICATIONS

Office Action for Korea Patent Application No. 10-2020-0179892, dated Feb. 23, 2022.

*Primary Examiner* — Vivian Chen

(57) ABSTRACT

The present invention relates to an exterior film of a building for protecting glass, which represents excellent weather resistance, impact resistance, and scratch resistance by a base layer combined with thermoplastic polyurethane and a functional coating layer, has self-healing ability, and can improve durability of glass by effectively blocking heat derived from ultraviolet and infrared rays.

8 Claims, 6 Drawing Sheets

(51) Int. Cl.
*C08L 75/04* (2006.01)
*C09D 133/08* (2006.01)
*C09D 175/04* (2006.01)
*C09J 133/08* (2006.01)
*C09J 175/04* (2006.01)

(56) References Cited

U.S. PATENT DOCUMENTS

| | | | | |
|---|---|---|---|---|
| 5,956,175 | A * | 9/1999 | Hojnowski | G02B 5/208 |
| | | | | 359/360 |
| 6,165,602 | A * | 12/2000 | Fujita | C08J 7/056 |
| | | | | 524/378 |
| 2010/0184901 | A1* | 7/2010 | Adochio | B82Y 30/00 |
| | | | | 977/773 |
| 2015/0093570 | A1* | 4/2015 | Tse | C08F 297/026 |
| | | | | 524/439 |
| 2017/0088758 | A1* | 3/2017 | Bzowej | C08G 18/348 |
| 2017/0267902 | A1* | 9/2017 | Ito | B32B 7/12 |
| 2022/0024194 | A1* | 1/2022 | Lee | C09D 175/04 |
| 2022/0072831 | A1* | 3/2022 | Lee | B60J 1/001 |
| 2022/0185942 | A1* | 6/2022 | Watanabe | C08G 18/10 |
| 2022/0195251 | A1* | 6/2022 | Oh | B32B 27/40 |
| 2023/0151249 | A1* | 5/2023 | Kim | C08G 18/4833 |
| 2023/0264454 | A1* | 8/2023 | Giron | B32B 7/12 |
| | | | | 428/41.8 |
| 2023/0303893 | A1* | 9/2023 | Fukuda | C09J 7/203 |

* cited by examiner

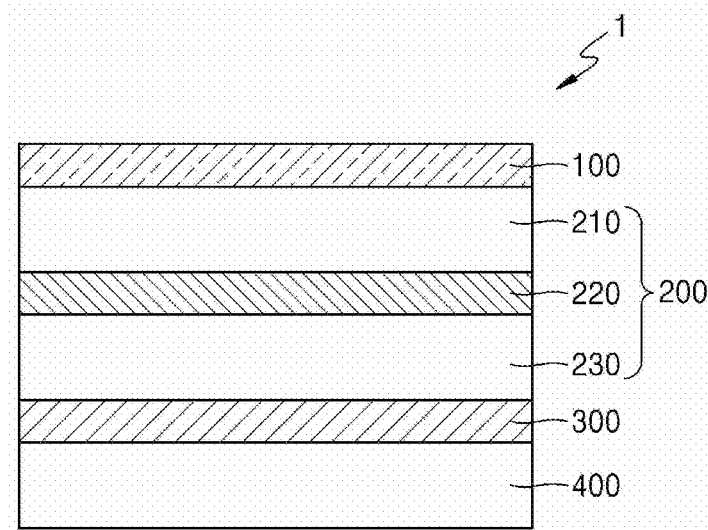

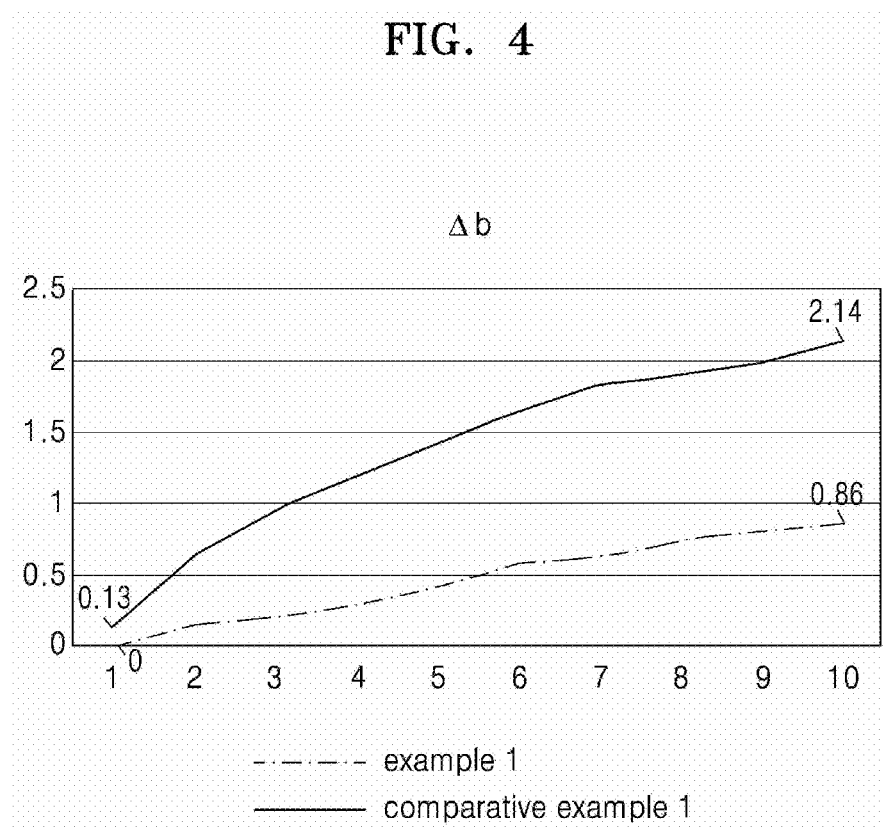

EXTERIOR FILM OF BUILDING FOR PROTECTING GLASS

BACKGROUND OF THE INVENTION

1. Field of the Invention

The present invention relates to an exterior film of a building for protecting glass, and more specifically to an exterior film of a building for protecting glass, which represents excellent weather resistance, impact resistance, and scratch resistance by a base layer combined with thermoplastic polyurethane and a functional coating layer, has self-healing ability, and can improve durability of glass by effectively blocking heat derived from ultraviolet and infrared rays.

2. Description of the Related Art

In general, a film attached to an exterior of glass of a building is called an exterior film or an architecture film. Recently, with the development of architectural technology and architectural design, a number of buildings, in which entire exterior walls of the buildings are made of glass or Low-e glass, have been built and the market for exterior films that can save energy while protecting the internal environment of the building is gradually expanding.

U.S. Pat. No. 9,303,132 (EXTERIOR WINDOW FILM, Related Patent 1) discloses an exterior film having a double structure of a PET layer and a PET layer. The conventional architectural films including the exterior window film disclosed in Related Patent 1 have a base layer with a double structure of PET-PET or PET-PMMA, but the PET and PMMA have relatively high hardness properties, so there is a problem that glass may be broken by external impact.

In addition, the conventional exterior films made of PET and PMMA have a problem in that the surface of the product is easily aged as it is continuously exposed to climatic environments such as temperature, humidity, and ultraviolet rays. In particular, when the exterior film is attached to the surface of Low-e glass, there is a problem in that an inert gas such as argon gas leaks due to the aging of the film, so that the function of the Low-e glass is deteriorated.

(Patent Document 0001) Patent Document 1: U.S. Pat. No. 9,303,132

SUMMARY OF THE INVENTION

An object of the present invention is to provide an exterior film of a building for protecting glass, which represents excellent weather resistance, impact resistance, and scratch resistance by a base layer combined with thermoplastic polyurethane and a functional coating layer, has self-healing ability, and can improve durability of glass by effectively blocking heat derived from ultraviolet and infrared rays.

In order to achieve the above object, one embodiment of the present invention provides an exterior film of a building for protecting glass, in which the exterior film includes a functional coating layer including a urethane-based material or an acrylic-based material; a base layer disposed under the functional coating layer and combined with thermoplastic polyurethane; and a second adhesive layer disposed under the base layer and including an acrylic copolymer, a curing agent, a solvent, and a UV blocker, wherein the base layer includes: a TPU layer including thermoplastic polyurethane; a first adhesive layer disposed under the TPU layer and including a urethane resin, a curing agent, carbon, a metal oxide, and a UV blocker; and a PET layer disposed under the first adhesive layer and including metal-treated polyethylene terephthalate, and wherein the functional coating layer has a function of self-healing or preventing scratches generated on a surface of the exterior film.

According to some embodiments of present invention, the exterior film may include 2 to 20 parts by weight of a UV blocker, in which 1 to 10 parts by weight of the UV blocker may be added to the first adhesive layer, and 1 to 10 parts by weight of the UV blocker may be added to the second adhesive layer.

According to some embodiments of present invention, the functional coating layer may include 75 to 90 parts by weight of a urethane resin, and 15 to 60 parts by weight of an isocyanate curing agent.

According to some embodiments of present invention, the functional coating layer may include 50 to 70 parts by weight of acrylic oligomer, 30 to 50 parts by weight of monofunctional and polyfunctional acrylic monomer, 1 to 5 parts by weight of a photoinitiator, and 0.1 to 3 parts by weight of a slip additive.

According to some embodiments of present invention, the functional coating layer may further include 0.5 to 3 parts by weight of an antibacterial additive.

According to some embodiments of present invention, the first adhesive layer may include 90 to 110 parts by weight of a urethane resin, 0.1 to 5 parts by weight of a curing agent, 1 to 20 parts by weight of carbon, 1 to 20 parts by weight of a metal oxide, and 1 to 10 parts by weight of a UV blocker.

According to some embodiments of present invention, the metal oxide may include at least one of WO3, ATO, and ITO.

According to some embodiments of present invention, the second adhesive layer may include 80 to 100 parts by weight of an acrylic copolymer, 0.5 to 2.5 parts by weight of a curing agent, 30 to 50 parts by weight of a solvent, and 1 to 10 parts by weight of a UV blocker.

According to some embodiments of present invention, the functional coating layer may have a thickness of 2 to 40 micrometers, the TPU layer may have a thickness of 10 to 100 micrometers, the first adhesive layer may have a thickness of 2 to 30 micrometers, the PET layer may have a thickness of 12 to 100 micrometers, and the second adhesive layer may have a thickness of 2 to 30 micrometers.

According to some embodiments of present invention, the exterior film may block 99% or more of ultraviolet rays and blocks 40 to 99% of infrared rays.

According to one embodiment of the present invention, it is possible to exhibit the effect of improving the weather resistance, durability, and impact resistance of the exterior film by the base layer combined with thermoplastic polyurethane.

According to one embodiment of the present invention, the functional coating layer is formed on the upper surface of the base layer to which the TPU layer is combined, so the effect of improving the scratch resistance properties can be realized by self-healing or preventing scratches that may be generated on the surface of the exterior film.

According to one embodiment of the present invention, the effect of effectively blocking ultraviolet and infrared rays, which are incident into glass to which the exterior film is attached, can be realized by the composition for forming the first adhesive layer.

According to one embodiment of the present invention, the TPU layer and the PET layer are combined with each other by the first adhesive layer containing carbon and metal oxide, so that ultraviolet and infrared rays can be blocked in advance, thereby preventing discoloration of the PET layer and improving durability.

According to one embodiment of the present invention, since the exterior film is attached to the surface of Low-e glass, heat caused by ultraviolet and infrared rays, which are incident onto glass, can be blocked, thereby minimizing the expansion and contraction of the argon gas layer and improving durability of glass.

According to one embodiment of the present invention, the UV blocker is dispersed and added to the two adhesive layers, so it is possible to exhibit the effect of preventing deterioration of the physical properties of each adhesive layer.

BRIEF DESCRIPTION OF THE DRAWINGS

FIG. 2 schematically shows a stack structure of an exterior film according to one embodiment of the present invention.

FIG. 4 schematically shows yellowing test results of Examples and Comparative Examples of an exterior film according to one embodiment of the present invention.

FIGS. 5A, 5B, and 5C schematically show the impact resistance test results of Examples and Comparative Examples of an exterior film according to one embodiment of the present invention.

DETAILED DESCRIPTION OF THE INVENTION

Figure 1:
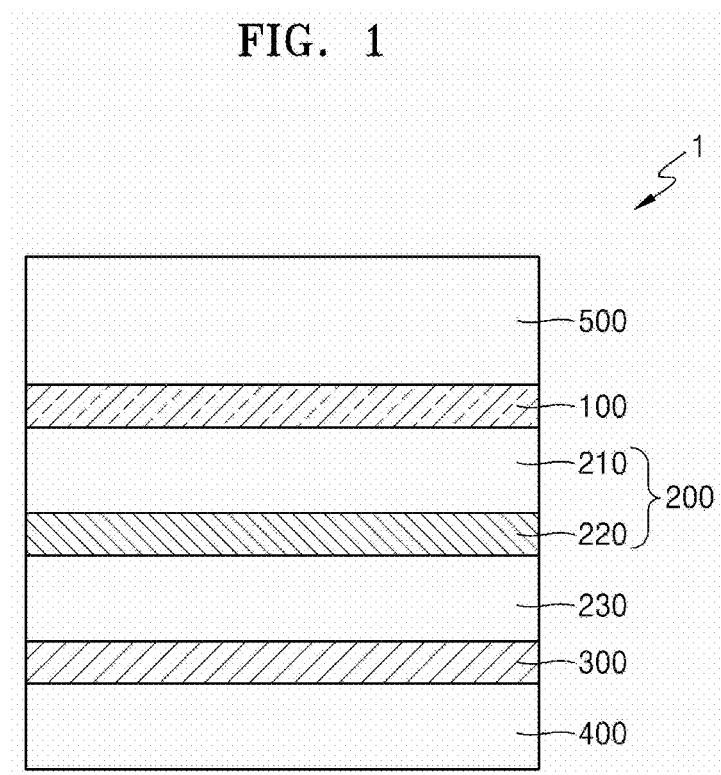
FIG. 1 schematically shows a stack structure of an exterior film according to one embodiment of the present invention.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

The term "embodiment", "example", "aspect", "exemplification", or the like as used herein may not be construed in that an aspect or design set forth herein is preferable or advantageous than other aspects or designs.

In addition, the term "or" is intended to signify an inclusive "or" rather than an exclusive "or". In other words, unless otherwise specified or contextually unclear, the expression "X uses A or B" is intended to signify one of natural inclusive substitutions. In other words, when X uses A; X uses B; or X uses both A and B, the expression "X uses A or B" may be applied to either of the above cases. In addition, it is apparent to be understood that the term "and/or" as used herein refers to and includes all possible combinations of one or more among related items listed.

In addition, the terms "include" and/or "comprise" specify the presence of the corresponding feature and/or component, but do not preclude the possibility of the presence or addition of one or more other features, components or combinations thereof.

In addition, unless explicitly indicated otherwise in this specification, it will be understood that singular expressions such as "one" include plural expressions. Accordingly, for example, a "component surface" includes one or more component surfaces.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, the term used herein is merely for the purpose of illustrating a particular embodiment, and it is not intended to limit the present invention. The singular expression includes a plural expression unless the context clearly means otherwise. In the specification herein, it will be understood that the term such as "include" and "have" is intended to designate the presence of feature, number, step, operation, element, component, or a combination thereof recited in the specification, which does not preclude the possibility of the presence or addition of one or more other features, numbers, steps, operations, elements, components, or combinations thereof.

In addition, in the embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, will not be interpreted as an ideal or excessively formal meaning unless expressly defined in the embodiments of the present invention.

Structure of Exterior Film 1

FIG. 1 schematically shows a stack structure of an exterior film 1 according to one embodiment of the present invention.

An exterior film 1 of a building for protecting glass according to one embodiment of the present invention includes: a functional coating layer 100 including a urethane-based material or an acrylic-based material; a base layer 200 disposed under the functional coating layer 100 and combined with thermoplastic polyurethane; and a second adhesive layer 300 disposed under the base layer 200 and including an acrylic copolymer, a curing agent, a solvent, and a UV blocker, in which the base layer 200 includes: a TPU layer 210 including thermoplastic polyurethane; a first adhesive layer 220 disposed under the TPU layer 210 and including a urethane resin, a curing agent, carbon, a metal oxide, and a UV blocker; and a PET layer 230 disposed under the first adhesive layer 220 and including metal-treated polyethylene terephthalate, and the functional coating layer 100 has a function of self-healing or preventing scratches generated on a surface of the exterior film 1.

As shown in FIG. 1, the exterior film 1 according to one embodiment of the present invention may include a functional coating layer 100, a base layer 200 disposed under the functional coating layer 100, and a second adhesive layer 300 disposed under the base layer 200. In addition, the base layer 200 may include a TPU layer 210, a first adhesive layer 220 disposed under the TPU layer 210, and a PET layer 230 disposed under the first adhesive layer 220.

That is, the exterior film 1 may include the functional coating layer 100, the base layer 200 including the TPU layer 210, the first adhesive layer 220, and the PET layer 230, and the second adhesive layer 300.

The functional coating layer 100 may include a urethane-based material or an acrylic material. In one embodiment of the present invention, the functional coating layer 100 may include a urethane resin, and an isocyanate curing agent.

The conventional exterior films have a feature that scratches are relatively generated due to a hard coating layer formed on the surface of the exterior film. However, since the hard coating layer has a high hardness, there is a problem that it is vulnerable to external impact.

In order to solve the above problem, the exterior film 1 of the present invention is formed on the surface thereof with the functional coating layer 100 including the above components. In this case, since the functional coating layer 100 can exhibit high elasticity, it is possible to prevent glass breakage due to external impact. For example, when a sparrow collides with glass of a building, damage to the glass can be prevented due to the impact resistance property of the functional coating layer 100.

That is, it is possible to implement the exterior film 1 having excellent impact resistance by forming the functional coating layer 100.

Preferably, the exterior film 1 includes the functional coating layer 100 made of a urethane-based material having a very high elasticity, thereby preventing glass breakage due to the external impact.

Preferably, the functional coating layer 100 according to one embodiment of the present invention may include 75 to 90 parts by weight of a urethane resin, and 15 to 60 parts by weight of an isocyanate curing agent.

The composition range of the functional coating layer 100 as described above corresponds to a range in which self-healing properties can be implemented. In this case, the functional coating layer 100 corresponds to the self-healing layer.

That is, as the functional coating layer 100 is made of the above composition, it is possible to implement a self-healing ability suitable for self-recovery of scratches generated on the surface of the exterior film 1. For example, when a scratch is generated on glass of a building due to a sandstorm, the scratch can be restored due to the self-healing ability of the functional coating layer 100.

That is, the exterior film 1 can maintain a clean surface by forming the functional coating layer 100.

Preferably, as the functional coating layer 100 having self-healing ability is formed, scratches that may be generated on the surface of the exterior film 1 can be self-restored to exhibit the effect of improving scratch resistance properties.

The functional coating layer 100 according to one embodiment of the present invention may further include 0.5 to 3 parts by weight of an antibacterial additive. In this case, the functional coating layer 100 may implement the antibacterial performance.

Meanwhile, the base layer 200 may be disposed under the functional coating layer 100 and may be combined with thermoplastic polyurethane (TPU). In one embodiment of the present invention, the base layer 200 may correspond to the TPU-combined base layer 200.

The conventional exterior film has a base layer 200 having a double structure of PET-PET or PET-PMMA. However, PET and PMMA have a problem in that the physical properties are deteriorated when exposed to a climatic environment, resulting in poor weather resistance.

In order to solve the above problem, according to the present invention, the TPU layer 210 is combined with the PET layer 230 by using the first adhesive layer 220 to form the base layer 200. That is, the exterior film 1 of the present invention may include the base layer 200 having a double structure of TPU-PET.

According to one embodiment of the present invention, the TPU layer 210 constituting the base layer 200 may be disposed under the functional coating layer 100 and may include thermoplastic polyurethane. Preferably, the TPU layer 210 may include non-yellowing thermoplastic polyurethane.

Thermoplastic polyurethane is a material that takes a very long time to break. In particular, the non-yellowing thermoplastic polyurethane is a material with excellent durability against ultraviolet rays. The TPU layer 210 including such a thermoplastic polyurethane may have excellent durability against the ultraviolet rays.

That is, it is possible to implement the exterior film 1 having excellent weather resistance and durability by combining the TPU layer 210 to form the base layer 200, In addition, the thermoplastic polyurethane is a material having high elasticity. The TPU layer 210 including such a thermoplastic polyurethane may exhibit high elasticity, thereby preventing glass breakage due to external impact.

That is, it is possible to implement the exterior film 1 having excellent impact resistance by combining the TPU layer 210 to form the base layer 200.

Preferably, the effect of improving the weather resistance, durability, and impact resistance of the exterior film 1 may be realized by the base layer 200 on which the thermoplastic polyurethane is combined.

In addition, according to one embodiment of the present invention, the first adhesive layer 220 constituting the base layer 200 may be disposed under the TPU layer 210, and may include a urethane resin, a curing agent, carbon, a metal oxide, and a UV blocker.

Preferably, the first adhesive layer 220 according to one embodiment of the present invention may include 90 to 110 parts by weight of a urethane resin, 0.1 to 5 parts by weight of a curing agent, 1 to 20 parts by weight of carbon, 1 to 20 parts by weight of a metal oxide, and 1 to 10 parts by weight of a UV blocker.

The carbon, which is one of the components of the first adhesive layer 220, may block infrared rays of a relatively low wavelength band. In addition, the carbon has a kind of tinting effect so that it can block a part of visible light.

The metal oxide, which is one of the components of the first adhesive layer 220, may block infrared rays of a relatively high wavelength band. In one embodiment of the present invention, the metal oxide may include at least one of $WO_3$, ATO, and ITO.

The UV blocker, which is one of the components of the first adhesive layer 220, may block the ultraviolet (UV) rays harmful to the human body such as skin and eyes.

The above composition range of the first adhesive layer 220 corresponds to a range suitable for implementing the blocking function for ultraviolet and infrared rays with high adhesiveness. Preferably, the exterior film 1 according to one embodiment of the present invention may block 99.99% or more of ultraviolet rays, and may block 80% or more of infrared rays.

That is, the ultraviolet and infrared rays, which are incident onto glass to which the exterior film 1 is attached, may be effectively blocked when the first adhesive layer 220 has the above composition.

In addition, the PET layer 230 constituting the base layer 200 may be disposed under the first adhesive layer 220 and may include metal-treated polyethylene terephthalate (PET).

The metal-treated polyethylene terephthalate corresponds to a polymer film coated with a thin metal layer. The thin metal layer may include at least one of aluminum, nickel, and chromium.

However, the metal-treated polyethylene terephthalate according to the present invention is not limited thereto, and may include any metal-treated polyethylene terephthalate generally used in the field of exterior films.

According to one embodiment of the present invention, it is possible to solve the issue related to the weather resistance in the conventional base layer 200 formed of a PET material by combining the TPU layer 210 with the PET layer 230 using the first adhesive layer 220.

More specifically, since TPU layer 210 is combined with the PET layer 230 by the first adhesive layer 220 including the carbon and the metal oxide, the ultraviolet and infrared rays may be blocked in advance, thereby preventing discoloration of the PET layer 230 and improving durability.

In addition, when the exterior film 1 of the present invention is attached to the surface of Low-e glass, heat derived from ultraviolet and infrared rays incident onto the glass can be blocked so that the expansion and contraction of an argon gas layer can be minimized and the durability of the glass can be improved.

Meanwhile, the second adhesive layer 300 may be disposed under the PET layer 230 and may include an acrylic copolymer, a curing agent, a solvent, and a UV blocker.

Preferably, the second adhesive layer 300 may include 80 to 100 parts by weight of an acrylic copolymer, 0.5 to 2.5 parts by weight of a curing agent, 30 to 50 parts by weight of a solvent, and 1 to 10 parts by weight of a UV blocker.

The above composition range of the second adhesive layer 300 corresponds to the range suitable for implementing the UV-blocking function with a high adhesiveness.

The exterior film 1 according to one embodiment of the present invention may include 2 to 20 parts by weight of a UV blocker, in which 1 to 10 parts by weight of the UV blocker is added to the first adhesive layer 220, and 1 to 10 parts by weight of the UV blocker may be added to the second adhesive layer 300.

As described above, each of the first adhesive layer 220 and the second adhesive layer 300 may include 1 to 10 parts by weight of the UV blocker.

That is, according to the present invention, the UV blocker is added by dispersing the UV blocker to the first adhesive layer 220 and the second adhesive layer 300.

Accordingly, it is possible to prevent deterioration of physical properties such as ultraviolet blocking, infrared blocking, and adhesive strength expressed by the composition of each layer.

Preferably, as the UV blocker is dispersed and added to the two adhesive layers, the effect of preventing the deterioration of the physical properties of each adhesive layer can be realized.

Meanwhile, as shown in FIG. 1, a release film 400 disposed under the second adhesive layer 300 may be further provided. In one embodiment of the present invention, the release film 400 may include a silicone release film.

The release film 400 may protect the second adhesive layer 300 until the exterior film 1 is attached to Low-e glass.

In addition, it is preferred that the release film 400 has a weak release force because the release film 400 needs be easily removed by an operator when the exterior film 1 is attached. In one embodiment of the present invention, the release film 400 may include general release films that have a weak release force which is rarely strengthened even if time elapses in a state which the release film 400 is attached to the second adhesive layer 300.

Meanwhile, as shown in FIG. 1, the exterior film 1 may further include a protective film layer 500 disposed on the functional coating layer 100 and including a silicone protective film.

The protective film layer 500 may protect the functional coating layer 100 just before and after the exterior film 1 is attached to the glass. For example, the protective film layer 500 may prevent contamination, etc. that may be generated when pressure is applied to the surface of the functional coating layer 100 during the film construction process.

As shown in FIG. 1, the exterior film 1 according to one embodiment of the present invention may have a layered structure in which the functional coating layer 100, the base layer 200, and the second adhesive layer 300 are stacked.

In more detail, the exterior film 1 may have a layered structure in which the functional coating layer 100, the base layer 200 including the TPU layer 210, the first adhesive layer 220 and the PET layer 230, and the second adhesive layer 300 are stacked.

The thickness of the functional coating layer 100 according to one embodiment of the present invention is 2 to 40 micrometers, the thickness of the TPU layer 210 is 10 to 100 micrometers, the thickness of the first adhesive layer 220 is 2 to 30 micrometers, the thickness of the PET layer 230 is 12 to 100 micrometers, and the thickness of the second adhesive layer 300 is 2 to 30 micrometers.

In addition, the thickness of the release film 400 according to one embodiment of the present invention is 12 to 50 micrometers, and the thickness of the protective film layer 500 is 20 to 100 micrometers.

As each layer constituting the exterior film 1 of the present invention is formed in the thickness range as described above, the exterior film 1 may represent excellent weather resistance, impact resistance, and scratch resistance, may have self-healing ability, and may improve the durability of glass by effectively blocking heat caused by ultraviolet and infrared rays.

FIG. 2 schematically shows a stack structure of an exterior film 1 according to one embodiment of the present invention.

As shown in FIG. 2, the exterior film 1 according to one embodiment of the present invention may include a functional coating layer 100, a base layer 200 disposed under the functional coating layer 100, and a second adhesive layer 300 disposed under the base layer 200. In addition, the base layer 200 may include a TPU layer 210, a first adhesive layer 220 disposed under the TPU layer 210, and a PET layer 230 disposed under the first adhesive layer 220.

The base layer 200 including the TPU layer 210, the first adhesive layer 220 and the PET layer 230, the second adhesive layer 300, and the release film 400 have properties, thickness, and effect the same as those of the components described above.

As described above, the functional coating layer 100 may include a urethane-based material or an acrylic material.

In one embodiment of the present invention, the functional coating layer 100 may include acrylic oligomer, monofunctional and polyfunctional acrylic monomer, a photoinitiator, and a slip additive.

Preferably, the functional coating layer 100 may include 50 to 70 parts by weight of acrylic oligomer, 30 to 50 parts by weight of a monofunctional and polyfunctional acrylic monomer, 1 to 5 parts by weight of a photoinitiator, and 0.1 to 3 parts by weight of a slip additive.

The above composition range of the functional coating layer 100 corresponds to the range suitable for implementing high hardness. In this case, the functional coating layer 100 corresponds to the hard coating layer.

That is, as the functional coating layer 100 has the above composition, it is possible to prevent scratches that may be generated on the surface of the exterior film 1. At the same time, it is possible to prevent contamination that may occur from the outside.

That is, the exterior film 1 can maintain a clean surface by forming the functional coating layer 100.

Preferably, as the functional coating layer 100 is formed on the upper surface of the base layer 200 on which the TPU layer 210 is combined, scratches that may be generated on the surface of the exterior film 1 may be prevented so that the scratch resistance property can be improved.

The functional coating layer 100 according to one embodiment of the present invention may further include 0.5 to 3 parts by weight of an antibacterial additive. In this case, the functional coating layer 100 can implement antibacterial performance.

In addition, the functional coating layer 100 according to one embodiment of the present invention can suppress the formation of a contamination layer on the surface of the functional coating layer 100 while continuously maintaining the antibacterial performance by the combination of the antibacterial additive and the slip additive.

That is, according to one embodiment of the present invention, as shown in FIG. 1, the exterior film 1 may have a configuration in which the functional coating layer 100 having a self-healing ability is formed on the base layer 200 combined with the TPU layer 210.

In addition, according to another embodiment of the present invention, as shown in FIG. 2, the exterior film 1 may have a configuration in which the functional coating layer 100 having a high hardness is formed on the base layer 200 combined with the TPU layer 210.

Hereinafter, Examples according to the present invention and Comparative Examples will be described. In addition, the results of the property tests of the Examples and Comparative Examples will be described in detail.

Example 1

A functional coating layer 100 including 80 parts by weight of a urethane resin and 48 parts by weight of isocyanate was formed on the upper surface of a TPU layer 210 having a thickness of 25 micrometers such that the functional coating layer 100 has a thickness of 12 micrometers, and a protective film layer 500 having a thickness of 54 micrometers was combined on the upper surface of the functional coating layer 100.

In addition, a second adhesive layer 300 including 85 parts by weight of an acrylic copolymer, 0.8 parts by weight of a curing agent, 2 parts by weight of a UV blocker, and 35 parts by weight of a solvent was formed on the lower surface of a PET layer 230 having a thickness of 23 micrometers such that the second adhesive layer 300 has a thickness of 10 micrometers, and a release film 400 having a thickness of 23 micrometers was combined on the lower surface of the second adhesive layer 300.

Then, a first adhesive layer 220 including 100 parts by weight of a urethane resin, 1.5 parts by weight of a curing agent, 10 parts by weight of carbon, 8 parts by weight of ceramic, and 2 parts by weight of a UV blocker was formed on the upper surface of a PET layer 230 such that the first adhesive layer 220 has a thickness of 10 micrometers, and the first adhesive layer 220 was combined on the lower surface of the TPU layer 210 to prepare the exterior film 1 for protecting glass. That is, the stack structure of Example 1 may be the same as the structure shown in FIG. 1 described above.

Comparative Example 1

An exterior film having a double structure of PMMA-PET that is generally metal-treated Comparison of Property Test Results of Exterior Film 1

Table 1 shows the test results for the UV blocking rate and IR blocking rate of Example 1 according to the present invention and Comparative Example 1.

In the present test, the UV blocking rate and IR blocking rate were measured using a portable solar specifier. In the case of the measured value of UV blocking rate, it was estimated that a measurement deviation of about 0.2% has occurred.

TABLE 1

| Film | UV blocking rate/IR blocking rate (%/%) |
|---|---|
| Example 1 | 100/84.6 |
| Comparative Example 1 | 99.8/64.8 |

As shown in Table 1, the UV blocking rate and IR blocking rate of Example 1 were 100 and 84.6%, respectively, and the UV blocking rate and IR blocking rate of Comparative Example 1 were 99.8 and 64.8%, respectively. That is, it was confirmed that the exterior film 1 according to the embodiment of the present invention has relatively excellent UV blocking rate and IR blocking rate.

In the exterior film 1, the UV blocking function refers to a function of blocking ultraviolet rays harmful to the human body such as the eyes and skin of people inside the building. That is, since the UV blocking rate of Example 1 according to the present invention was measured as 100%, it is determined that the exterior film 1 of the present invention can effectively block the ultraviolet rays.

In addition, in the exterior film 1, the IR blocking function refers to a function of blocking infrared rays that may generate heat inside the building and on the glass. That is, since the IR blocking rate of Example 1 according to the present invention was measured as 84.6%, it is determined that the exterior film 1 of the present invention can effectively block the infrared rays compared to Comparative Example 1.

As described above, Example 1 according to the present invention can effectively block the ultraviolet rays and infrared rays.

That is, since the base layer 200 is formed by combining the TPU layer 210 with the PET layer 230 using the first adhesive layer 220, the exterior film 1 according to one embodiment of the present invention can effectively block the ultraviolet rays and infrared rays.

According to one embodiment of the present invention, when the exterior film 1 is attached to Low-e glass, the exterior film 1 can effectively block heat derived from the ultraviolet rays and infrared rays so that contraction/expansion of inert gases such as argon in the glass can be prevented, thereby improving the durability of the glass.

Table 2 and FIGS. 3 and 4 show test results for the weather resistance of Example 1 according to the present invention and Comparative Example 1. In the present test, the exterior film 1 was irradiated with UV light at an amount of about 1,000 mj/cm² for 5 hours.

FIGS. 3A, 3B, 3C, and 3D schematically show the durability test results of Examples and Comparative Examples of an exterior film 1 according to one embodiment of the present invention. In the present test, the durability was determined through visual inspection of the product surface.

Figure 3A:
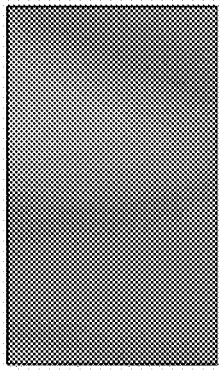
FIGS. 3A, 3B, 3C, and 3D schematically show the durability test results of Examples and Comparative Examples of an exterior film according to one embodiment of the present invention.
Figure 3B:
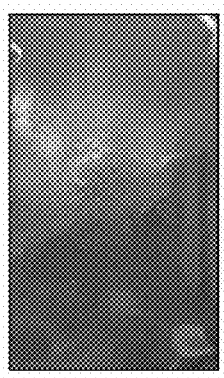

FIGS. 3A and 3B schematically show photographs of surfaces of Example 1 according to the present invention, which are photographs before and after the durability test, respectively.

As a result of the durability test, in Example 1, it was confirmed that the color of the surface was changed as it was continuously exposed to UV light. However, it was confirmed that there is no breakage or damage to the surface.

Figure 3C:
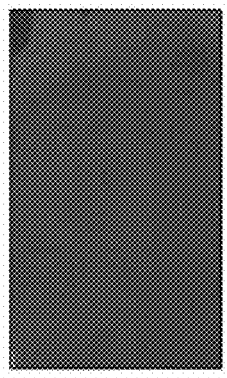
Figure 3D:
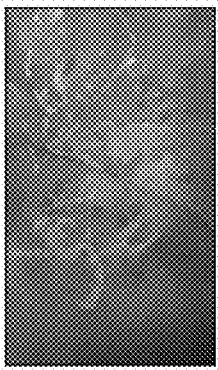

FIGS. 3C and 3D schematically show photographs of surfaces of Comparative Example 1, which are photographs before and after the durability test, respectively.

As a result of the durability test, in Comparative Example 1, it was confirmed that the color of the PMMA layer corresponding to the surface layer was changed as it was continuously exposed to UV light and aging occurred rapidly. In addition, it was found that the film is broken due to cracks caused by aging and the film layers are separated.

That is, the color of the film surface was changed in both of Example 1 according to the present invention and Comparative Example 1, but the breakage or damage to the surface did not occur in Example 1. Therefore, it was determined that the exterior film 1 of the present invention has a relatively excellent durability.

FIG. 4 schematically shows the yellowing test results of Example 1 according to the present invention and Comparative Example 1.

In the present test, the yellowing phenomenon of the product was determined by measuring the b* value through a spectrophotometer before and after the test. As the b* value increases from green (−) to yellow (+), it means that the product has changed to yellow.

As shown in FIG. 4, it was confirmed that the Δb* value of Comparative Example 1 differs by about 2 times or more compared to Example 1 according to the present invention.

Table 2 shows the measurement values measured during the yellowing test. In Table 2 below, b*(start), b*(end), and Δb* refer to the measurement value before the yellowing test, the measurement value after the yellowing test, and the difference of b* before and after the yellowing test, respectively.

TABLE 2

| Film | b* (start) | b* (end) | Δb* |
|---|---|---|---|
| Example 1 | 0.01 | 1.34 | 1.33 |
| Comparative Example 1 | 0.18 | 2.54 | 2.36 |

As shown in Table 2, b*(start), b*(end), and Δb* of Example 1 were 0.01, 1.34, and 1.33, respectively, and b*(start), b*(end), and Δb* of Comparative Example 1 were 0.18, 2.54, and 2.36, respectively.

Referring to the results shown in FIG. 4 and Table 2, it is determined that the exterior film 1 according to one embodiment of the present invention has a relatively excellent yellowing property.

As described above, Example 1 according to the present invention represents relatively excellent durability and yellowing properties, so it is determined that the weather resistance is relatively excellent. That is, since the base layer 200 is formed by combining the TPU layer 210 with the PET layer 230 using the first adhesive layer 220, the weather resistance of the exterior film 1 according to one embodiment of the present invention can be improved.

FIGS. 5A, 5B, and 5C schematically show the results of the impact resistance test of the Example and Comparative Example of the exterior film 1 according to one embodiment of the present invention.

In the present test, an impact resistance test was performed using a Gravalometer shown in FIG. 5A. At this point, an impact was continuously applied to the surface of the film for 3 minutes using a weight attached to equipment.

As shown in FIG. 5B, damage occurred on the surface of the exterior film 1 after the test in Example 1, but it was found that there was no abnormality in glass to which the exterior film 1 was attached.

Meanwhile, as shown in FIG. 5C, in Comparative Example 1, the exterior film was penetrated by a weight attached to equipment for the impact resistance test, and the glass surface to which the exterior film was attached was damaged.

As described above, it is determined that Example 1 according to the present invention has relatively excellent shock absorption performance. That is, since the base layer 200 is formed by combining the TPU layer 210 with the PET layer 230 using the first adhesive layer 220, the impact resistance of the exterior film 1 according to one embodiment of the present invention can be improved.

FIGS. 6A, 6B, 6C, 6D, and 6E schematically show the results of the scratch test of the Example and Comparative Example of an exterior film 1 according to one embodiment of the present invention.

Figures 6A, 6B, 6C, 6D, 6E:
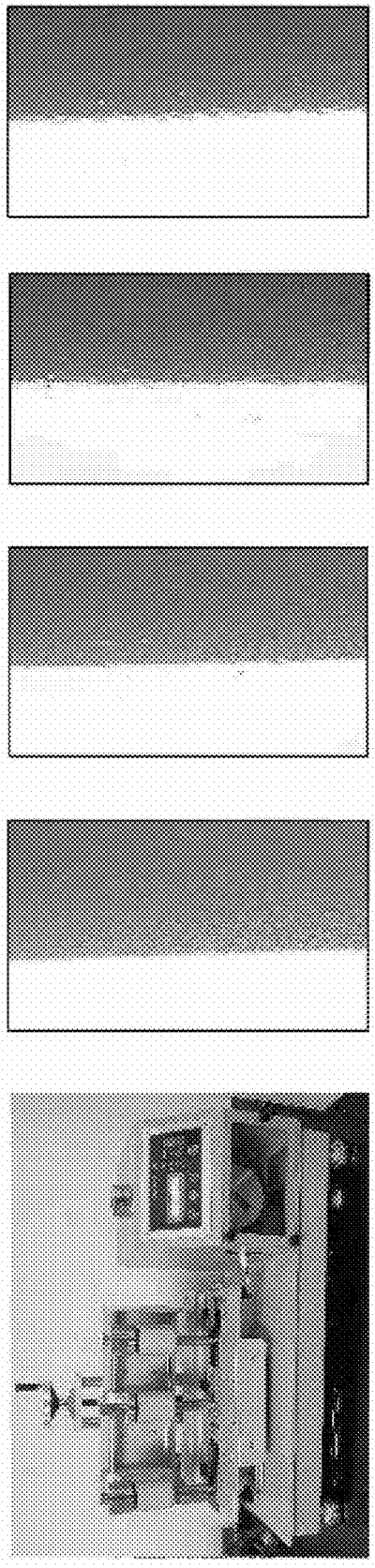
FIGS. 6A, 6B, 6C, 6D, and 6E schematically show the scratch test results of Examples and Comparative Examples of an exterior film according to one embodiment of the present invention.

In the present test, it was confirmed whether scratches were generated on the film surface under the conditions of 500 g, 20 rpm, and 100 reciprocations using abrasion resistance test equipment shown in FIG. 6A.

FIGS. 6B and 6C schematically show photographs of the surfaces of Example 1 according to the present invention, which are photographs before and after the scratch test, respectively. Example 1 corresponds to the exterior film 1 in which a self-healing layer is formed on the surface with the composition described above.

As a result of the scratch test, scratches were generated on the surface in Example 1, but it was confirmed that the scratches were restored to a level similar to that of the initial product by the functional coating layer 100 having the self-healing ability.

FIGS. 6D and 6E schematically show photographs of the surfaces of Comparative Example 1 before and after the scratch test, respectively. Comparative Example 1 corresponds to a general exterior film having a hard coating layer formed on the surface thereof.

As a result of the scratch test, it was confirmed that no scratches were generated on the surface by the hard coating layer in Comparative Example 1.

As described above, according to Example 1 of the present invention, scratches generated on the surface can be effectively restored by the functional coating layer corresponding to the self-healing layer.

That is, it can be determined that the functional coating layer having self-healing ability according to one embodiment of the present invention has scratch resistance similar to that of the hard coating layer. In addition, it is possible to improve the impact resistance of the exterior film.

According to one embodiment of the present invention, it is possible to exhibit the effect of improving the weather resistance, durability, and impact resistance of the exterior film by the base layer combined with thermoplastic polyurethane.

According to one embodiment of the present invention, since the functional coating layer is formed on the upper surface of the base layer to which the TPU layer is combined, the effect of improving scratch resistance properties can be realized by self-healing or preventing scratches that may be generated on the surface of the exterior film.

According to one embodiment of the present invention, the effect of effectively blocking ultraviolet and infrared rays, which are incident into glass to which the exterior film is attached, can be realized by the composition for forming the first adhesive layer.

According to one embodiment of the present invention, the TPU layer and the PET layer are combined with each other by the first adhesive layer containing carbon and metal oxide, so that ultraviolet and infrared rays can be blocked in advance, thereby preventing discoloration of the PET layer and improving durability.

According to one embodiment of the present invention, since the exterior film is attached to the surface of Low-e glass, heat caused by ultraviolet and infrared rays, which are incident onto glass, can be blocked, thereby minimizing the expansion and contraction of the argon gas layer and improving durability of glass.

According to one embodiment of the present invention, the UV blocker is dispersed and added to the two adhesive layers, so it is possible to exhibit the effect of preventing deterioration of the physical properties of each adhesive layer.

The descriptions of the described embodiments are provided to enable any person having ordinary skill in the art to use or implement the present invention. It will be apparent to the person having ordinary skill in the art that various modifications are available for the embodiments, and general principles defined herein may be applied to other embodiments without departing from the scope of the present invention. Accordingly, the present invention should not be limited to the embodiments set forth herein but should be construed in the broadest scope consistent with the principles and novel features set forth herein.

What is claimed is:

1. An exterior film of a building for protecting glass, the exterior film comprising:
    a functional coating layer including a urethane-based material;
    a base layer disposed under the functional coating layer and combined with thermoplastic polyurethane; and
    a second adhesive layer disposed under the base layer and including an acrylic copolymer, a curing agent, a solvent, and a UV blocker,
    wherein the base layer includes:
    a TPU layer including thermoplastic polyurethane;
    a first adhesive layer disposed under the TPU layer and including a urethane resin, a curing agent, carbon, a metal oxide, and a UV blocker; and
    a metal treated PET layer disposed under the first adhesive layer and including metal-treated polyethylene terephthalate,
    wherein the functional coating layer has a function of self-healing or preventing scratches generated on a surface of the exterior film; and,
    wherein the first adhesive layer, which directly contacts the TPU layer and the metal treated PET layer, has a thickness of 5 to 30 micrometers and comprises 90 to 110 parts by weight of a urethane resin, 0.1 to 5 parts by weight of a curing agent, 1 to 20 parts by weight of carbon, 1 to 20 parts by weight of a metal oxide, and 1 to 10 parts by weight of a UV blocker.

2. The exterior film of claim 1, wherein the exterior film includes 2 to 20 parts by weight of a UV blocker, in which 1 to 10 parts by weight of the UV blocker is added to the first adhesive layer, and 1 to 10 parts by weight of the UV blocker is added to the second adhesive layer.

3. The exterior film of claim 1, wherein the functional coating layer includes 75 to 90 parts by weight of a urethane resin, and 15 to 60 parts by weight of an isocyanate curing agent.

4. The exterior film of claim 1, wherein the functional coating layer further includes 0.5 to 3 parts by weight of an antibacterial additive.

5. The exterior film of claim 1, wherein the metal oxide includes at least one of $WO_3$, ATO, and ITO.

6. The exterior film of claim 1, wherein the second adhesive layer includes 80 to 100 parts by weight of an acrylic copolymer, 0.5 to 2.5 parts by weight of a curing agent, 30 to 50 parts by weight of a solvent, and 1 to 10 parts by weight of a UV blocker.

7. The exterior film of claim 1, wherein the functional coating layer has a thickness of 2 to 40 micrometers, the TPU layer has a thickness of 10 to 100 micrometers, the PET layer has a thickness of 12 to 100 micrometers, and the second adhesive layer has a thickness of 2 to 30 micrometers.

8. The exterior film of claim 1, wherein the exterior film blocks 99% or more of ultraviolet rays and blocks 40 to 99% of infrared rays.

* * * * *